United States Patent
Yankov et al.

(10) Patent No.: US 10,168,668 B2
(45) Date of Patent: Jan. 1, 2019

(54) METHOD OF FORMING A RAREFIED HOLOGRAM FOR VIDEO IMAGING AND 3D LITHOGRAPHY

(71) Applicants: Vladimir Yankov, Washington Township, NJ (US); Konstantin Kravtsov, Moscow (RU); Leonid Velikov, San Carlos, CA (US)

(72) Inventors: Vladimir Yankov, Washington Township, NJ (US); Konstantin Kravtsov, Moscow (RU); Leonid Velikov, San Carlos, CA (US)

( * ) Notice: Subject to any disclaimer, the term of this patent is extended or adjusted under 35 U.S.C. 154(b) by 168 days.

(21) Appl. No.: 15/386,498

(22) Filed: Dec. 21, 2016

(65) Prior Publication Data

US 2018/0173159 A1    Jun. 21, 2018

(51) Int. Cl.
  *G03H 1/08*    (2006.01)
  *G03H 1/00*    (2006.01)
  *G03H 1/22*    (2006.01)

(52) U.S. Cl.
  CPC ......... *G03H 1/0841* (2013.01); *G03H 1/0005* (2013.01); *G03H 1/2202* (2013.01); *G03H 1/2294* (2013.01); *G03H 2001/0088* (2013.01); *G03H 2001/0094* (2013.01); *G03H 2001/2223* (2013.01); *G03H 2222/20* (2013.01); *G03H 2223/17* (2013.01); *G03H 2223/19* (2013.01); *G03H 2225/24* (2013.01); *G03H 2225/32* (2013.01); *G03H 2225/55* (2013.01)

(58) Field of Classification Search
  CPC .. G03H 1/0841; G03H 1/0005; G03H 1/2202; G03H 1/2294; G03H 2001/0088; G03H 2001/0094; G03H 2001/2223; G03H 2222/20; G03H 2223/17; G03H 2223/19; G03H 2225/24; G03H 2225/32; G03H 2225/55
  USPC .............................................. 359/9
  See application file for complete search history.

(56) References Cited

U.S. PATENT DOCUMENTS

| 8,154,780 | B2 | 4/2012 | Cable et al. |
| 2010/0097673 | A1 | 4/2010 | Cable |

FOREIGN PATENT DOCUMENTS

| GB | 0512179.3 | 9/2009 |
| WO | WO 2006/134398 | 12/2006 |
| WO | WO 2007/031797 | 5/2007 |
| WO | WO 2007/110668 | 10/2007 |
| WO | WO 2016/118640 | 7/2016 |

*Primary Examiner* — Wen Huang (57) ABSTRACT

A method of forming a rarefied hologram for video imaging and 3D lithography by using an MEMS/SLM with a plurality of pixels on the surface at a fixed distance from the retina of the viewer' eye. The method consists of providing an initial desired image, which has to be holographically reproduced by the MEMS/SLM as a remote virtual 3D image visible by the viewer's eye. The desired image is coded in a special manner and mapped by encoding and calculating only a part of the initial desired image. The operations of the pixels are controlled in accordance with the code for generation of the holographic pattern. Since only a part of a holographic pattern of the image is encoded and calculated, it becomes possible to reduce the calculation time and decrease parasitic light scattering.

11 Claims, 6 Drawing Sheets

METHOD OF FORMING A RAREFIED HOLOGRAM FOR VIDEO IMAGING AND 3D LITHOGRAPHY

FIELD OF THE INVENTION

This invention relates to a method of forming a rarefied hologram for video Imaging and 3D lithography. The invention also relates to dynamically processing coherent light for obtaining computer-generated holograms. In particular, the invention relates to a method for obtaining rarefied holograms, which include elements the number of which is from ten to hundred times fewer than the number of elements from which conventional holograms are formed. This technology is applicable to 3D displays and 3D lithographers and allows to obtain a clear virtual image without so-called ghosts and with suppression of associated noise.

PRIOR ART

Static analog holograms, static computer-generated holograms, non-holographic dynamic microelectromechanical system (MEMS) mirrors, and Liquid Crystal displays, as well as spatial light modulators (SLMs), are known in the art. Also, known in the art are hologram-using glasses and methods for combining real and virtual images.

Virtual images can be produced by various methods known in the art. One of them is a method for generation of a holographic virtual image with the aid of a computing device, e.g., a computer used in the image-forming process for multiple calculations. For example, a computer calculates a holographic fringe pattern that is then used to set the optical properties of a spatial light modulator (SLM), such as a liquid crystal microdisplay. The SLM then diffracts the read-out light wave, in a manner similar to a conventional hologram, to yield the desired optical wave front.

The function of the SLM is to modulate the illuminating light by blocking the intensity of light (pure amplitude modulation) or by retarding the light (pure phase modulation), or by both. For practical use the phase-SLMs are advantageous over the amplitude-SLMs. This is because the phase components of the complex field carry more information, and their efficiency (i.e. the fraction of the illuminated beam which is converted to the reconstructed object) is greater for phase than for the amplitude-modulation.

The phase of light can be modulated in various ways, including a method based on increasing the travel distance or thickness of the material by a fraction of the wavelength or by changing the refractive index so that the light travels with a higher or slower speed.

Irrespective of the phase-modulation method, performance of existing 3D holographic images is limited due to the size and switching speed of SLMs. For spatial high resolution holography, a large and dense array of small-size SLMs is required. The smaller the size of the SLMs, the higher the angular diffraction and wider the viewing zone of the resulting display. Current SLM matrices that are based on LCDs and LCoSs are already approaching the size limit with pixels below 7.5 µm. This makes them applicable for forming color image-moving holograms. Other methods achieving the same results are possible with the use of MEMS optical components.

Thus, as has been described above, the formation of a computer-aided holographic virtual image is based on the following principle. A beam of a coherent light is sent to the surface of a space light modulator or microelectromechanical mirror system MEMS (hereinafter referred to as an MEMS/SLM where appropriate) and either passes through the MEMS/SLM or is reflected therefrom. The MEMS/SLM converts the incident coherent (e.g., laser) into a modulated beam which is then redirected to the retina of the viewer eye. The viewer perceives the modulated beam as a 3D-image of a certain remote object, wherein the modulation of light beam into the 3D-image is performed by means of the MEMS/SLM under the control of a computer.

As stated above, devices and methods for creating computer-aided holographic virtual images are known in the art. It should be taken into account that formation of any computer-aided holographic virtual image is associated with a great number of calculation.

A typical hardware setup for computer generation hologram is described in GB Patent Application Publication No. 0512179.3 filed on Jun. 15, 2005. A holographic projection module comprises: a substantially monochromatic light source, such as a laser diode; a spatial light modulator (SLM) to (phase) modulate the light to provide a hologram for generating a displayed image; and a demagnifying optical system to increase the divergence of the modulated light to form the displayed image. The size of a displayed image depends on the pixel size of the SLM. The smaller the pixels, the larger image can be produced. The demagnifying optics increase the diffraction, thus allowing an image of a larger size to be displayed at a given distance. The displayed image is substantially focus-free: that is the image is substantially in focus over a wide range or at all distances from the projection module. The techniques that are described in this patent application may be employed with a system or procedure of any type for calculating a hologram to display on the SLM in order to generate the displayed image. Further development of the proposed method suggests a procedure, in which the displayed image can be formed from a plurality of holographic sub-frames that may be combined into a desired resulting image. Thus, for example, such holographic sub-frames can be temporally displayed in rapid succession so as to be integrated within the human eye. The data for successive holographic sub-frames may be generated by a digital signal processor (DSP), which may comprise either a general-purpose software-controlled DSP, e.g., in association with a program stored in memory, or a dedicated hardware, or a combination of both. The SLM may comprises a reflective SLM (for compactness) but in general any type of pixilated microdisplay which is able to modulate the phase of the light, optionally, in association with an appropriate driver chip.

Further development of the techniques for displaying holographic images is described, e.g., in the following International Patent Application Publications: WO2005/059660 (Noise Suppression Using One Step Phase Retrieval), WO2006/134398 (Hardware for One Step Phase Retrieval), WO2007/031797 (Adaptive Noise Cancellation Techniques), WO2007/110668 (Lens Encoding), and in U.S. Pat. No. 8,154,780 that discloses a holographic image projection system for projecting an image at an acute angle onto a surface.

Many attempts have been made heretofore for accelerating formation of virtual holographic images.

For example, International Patent Application Publication WO 2016118640 A1 discloses a visual display with time multiplexing, wherein a given image is displayed by generating a succession of partial real images, each representing a part of the given image and together representing the entire image, and at least some of the partial real images occupying overlapping positions. The partial real images are successively imaged to form a sub-image viewable from an eye position. The sub-images combine spatially and temporally to form a virtual image viewable from the eye position so that said overlapping portions of different partial real images from different portions of the virtual image. The partial real images may be displayed on a digital or other display, and imaged by optical channels each using one or more lenslets. This is a typical system used for augmented reality.

In any case, the creation of a computer-aided holographic virtual image is limited by stationary or slowly changeable images. This is because change of the virtual image seen by a viewer is associated with a tremendous number of calculations which require the use of image-forming devices having high capacity capable of performing such calculations. In many cases such image-forming devices are difficult and expansive to manufacture. This problem is aggravated if a movable holographic image is needed since in that case the amount of computerized calculations is multiplied.

SUMMARY OF THE INVENTION

This invention relates to a method of forming a rarefied hologram for video Imaging and 3D lithography and can be used in 3D displays, head-mounter displays and glasses and in semiconductor lithography equipment. The method of the invention consists of the following steps: providing an MEMS/SLM which is seen by a viewer and has a plurality of pixels, and a laser light source for illuminating the pixels of the MEMS/SLM; creating an initial desired image, which has to be holographically reproduced by the MEMS/SLM as a virtual 3D image visible remotely by the viewer; coding the desired image by breaking the image into plurality groups of areas and assigning groups of MEMS/SLM pixels to predetermined groups responsible for reproducing a predetermined area of the desired image; irradiating the pixelated surface of the MEMS/SLM by a laser beam; controlling operations of the pixels in accordance with the code for generation of the holographic image perceived by the viewer eye as a remote virtual 3D image.

Normally, the formation of such remote virtual 3D image by holographic methods requires a large number of calculations performed by a computer. The number of the calculations needed for creating a large high quality image may be so tremendous that it approaches to the limit capacity of the image-forming equipment. This is especially true when it is required to create a moving image since in this case the number of calculations increases in times.

It is an object of the present invention to provide a method aimed at a solution of the above problem by significantly reducing the number of calculations needed for creating a holographic virtual 3D image due to generation of a so-called rarefied hologram. In fact, a rarefied hologram is an entirely new concept which was invented by the applicants and introduced herein for the first time.

More specifically, the image on the display is mapped so that only a part of a holographic pattern of an image on the MEMS/SLM is encoded and calculated. This saves the calculation time and decreases a parasitic light scattering.

It is assumed, according to the method of the invention, that the coherence length of the laser light source is equal to or greater in diameter than the diameter of the pupil of the viewer's eye. By connecting the extreme points of the virtual image with the point on the viewer's eye that limit the aperture of the eye pupil, it is possible to obtain a tapered space in which a wavefront that must form the virtual image should propagate in the direction toward the eye. This wavefront may be generated by a reflective MEMS/SLM of a pixel matrix type which changes phases of the light reflected from the pixels. The MEMS/SLM is placed between the viewer's eye and the virtual image.

It should be noted that one condition for carrying out the proposed method is a fixed distance from the retina of the viewer's eye and the MEMS/SLM surface. This is achieved if the SLMs are formed, e.g., on the lenses of the glasses fixed relative to the retinas of the viewer's eyes.

For example, in case of an 8-bit reflective spatial matrix-type modulator with an active area of 25.6 mm×15.4 mm with a pixel pitch of 20 μm and with a resolution capacity of 1280×768 and division of the modulator into regular fragments, e.g., 10×10 pixels in each fragment, it is possible to obtain about $10^4$ of such fragments. The hologram that is created in the above case by these $10^4$ points is a rarefied hologram obtained by the method of the invention. It is understood that $10^4$ points are given only as an example.

If lines from the extreme point of the pupil are projected through the aforementioned fragments to respective points on the object, it is possible to obtain about $10^4$ points which will present the virtual image in the viewer's eye.

Thus, it becomes possible to reproduce the complete image by utilizing only a part of the image pattern and using of an order fewer number of calculations.

BRIEF DESCRIPTION OF THE DRAWINGS

The features of the invention will be better understood by reference to the accompanying drawings which illustrate presently preferred embodiments of the invention. In the drawings:

FIG. 3b is a sectional view along line IIIb-IIIb of FIG. 3a.

DETAILED DESCRIPTION OF THE INVENTION

This invention relates to a novel method of forming so-called rarefied holograms for video Imaging and 3D lithography. This concept of a rarefied hologram presented herein is entirely new and has been developed for the first time by the applicants. More specifically, the rarified holograms mean holograms that contain a reduced number of holographic elements and therefore possesses a "density" lower than conventional holograms that used for achieving the same results.

In other words, the invention also relates to dynamically processing coherent light for obtaining computer-generated holograms, which include elements the number of which is from ten to hundred times fewer than the number of elements from which conventional holograms are formed. This technology is applicable to 3D displays and 3D lithographers and is capable to create clear holographic virtual images which are free of so-called "ghosts" and characterized by reduced noise.

Figure 1A:
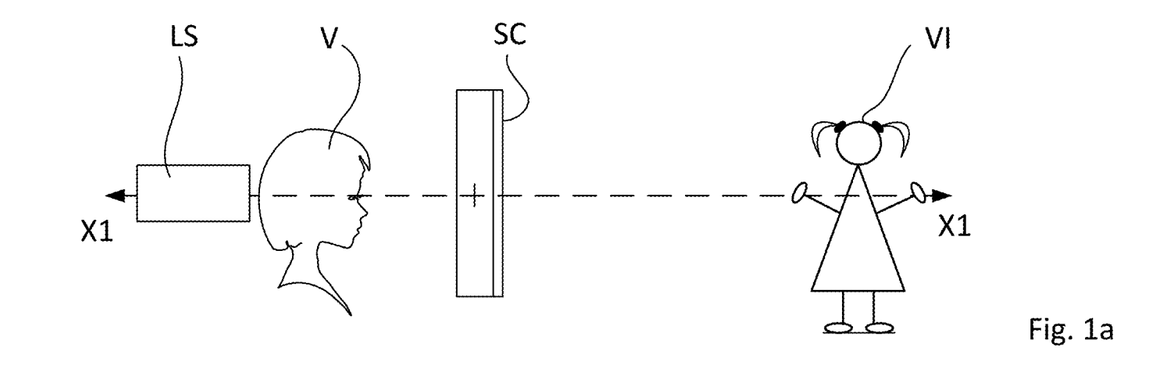
FIG. 1a is a schematic side view of an optical system that illustrates the principle of the invention.
Figure 1B:
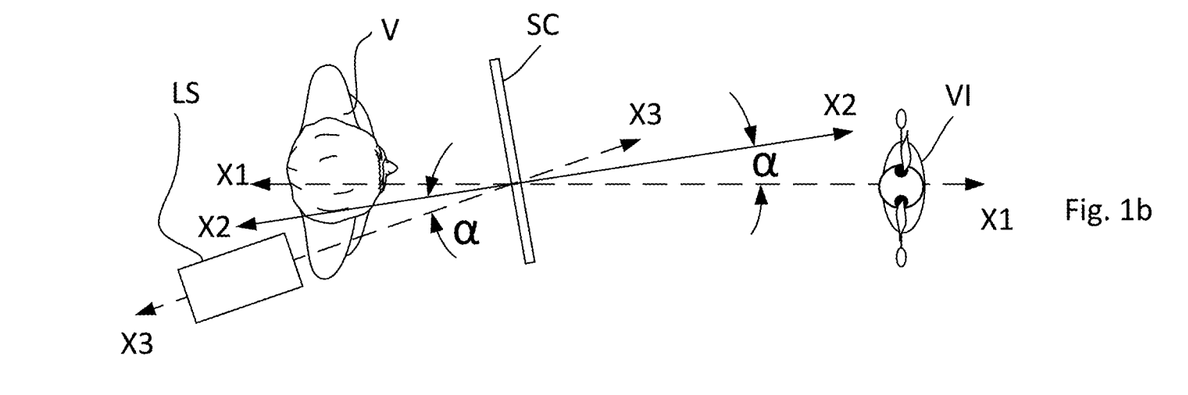
FIG. 1b is a top view on the objects of FIG. 1.

The method of the present invention for the formation of a rarefied hologram will now be described with reference to FIGS. 1a and 1b, where FIG. 1a is a schematic side view of an optical system that illustrates the principle of the invention, and FIG. 1b is a top view of the objects shown in FIG. 1a.

More specifically, FIGS. 1a and 1b illustrate an optical system in which a rarefied pixilated virtual image can be created. The reference symbol LS designates a coherent laser source, V is a viewer, SC is a non-transparent active screen the structure of which will be described later, and VI is a virtual image, which in this case constitutes a virtual hologram seen by the viewer V.

Figure 2:
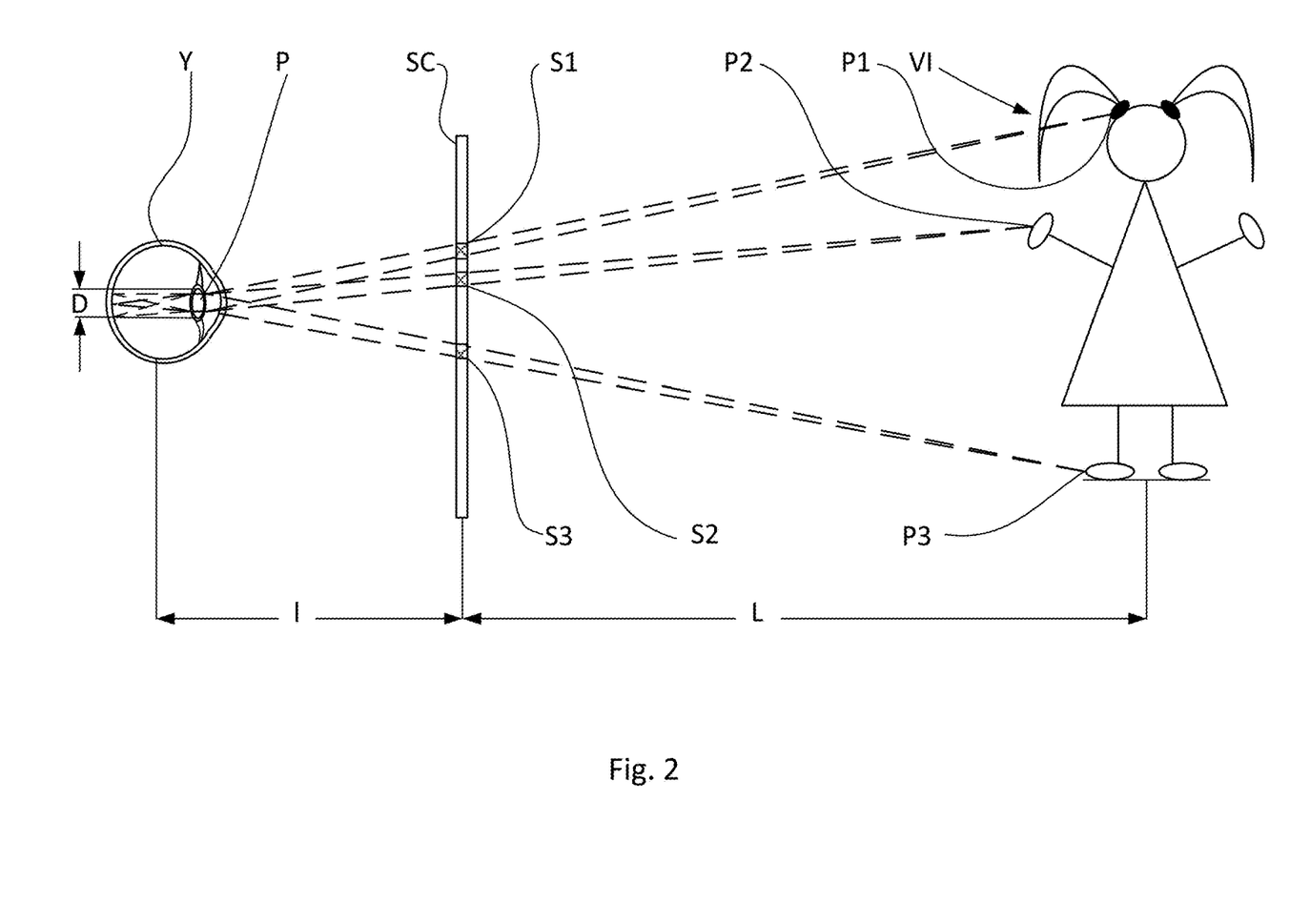
FIG. 2 is a schematic side view that illustrates the principle used for rarefication of a pixelated virtual image in accordance with the present invention.

FIG. 2 is a schematic side view that illustrates the principle used for rarefication of a pixelated virtual image in accordance with the present invention.

For simplicity of the explanation the optical system is shown for one eye of the viewer. However, the same principle is applicable for viewing a virtual image simultaneously with two eyes. In FIG. 2, the parts of the screen designated as S1, S2, and S3 correspond to certain points P1, P2, and P3 of the holographic image VI for generation of which these parts of the screen are responsible. It should be noted that in reality each point belongs to a certain area of the image. These areas are arranged discretely on a predetermined surface and in fact comprise parts of the rarefied hologram while in combination they reproduce the entire holographic image. Each part of the screen such as parts S1, S2, S3, etc. may contain a large number of pixels, e.g., 100, 200, . . . 1000 pixels, or more.

It is important to note that in the optical system of the invention a distance from the screen SC to the pupil P of the viewer's eye Y (FIG. 2) must be constant. This condition can be fulfilled, e.g., by installing the screen SC on a head-wearable device such as a helmet (not shown).

The screen SC is an active non-transparent screen that creates on the retina of the eye an image. The screen has a plurality of pixels comprising independently working and individually controllable light-emitting elements, and the term "active" means that the image is created by reflection from these pixilated light emitting elements.

As can be seen from FIG. 1b, the screen SC may be turned at a certain angle α with respect to an axis X1-X1 that comprises an optical axis of the eye Y. In this case, the optical axis X3-X3 of the light source SC is turned at angle α to the optical axis of the screen SC. The axis X2-X2 is a perpendicular to the screen SC. All three axes X1-X1, X2-X2 and X3-X3 are coplanar.

Figure 3A:
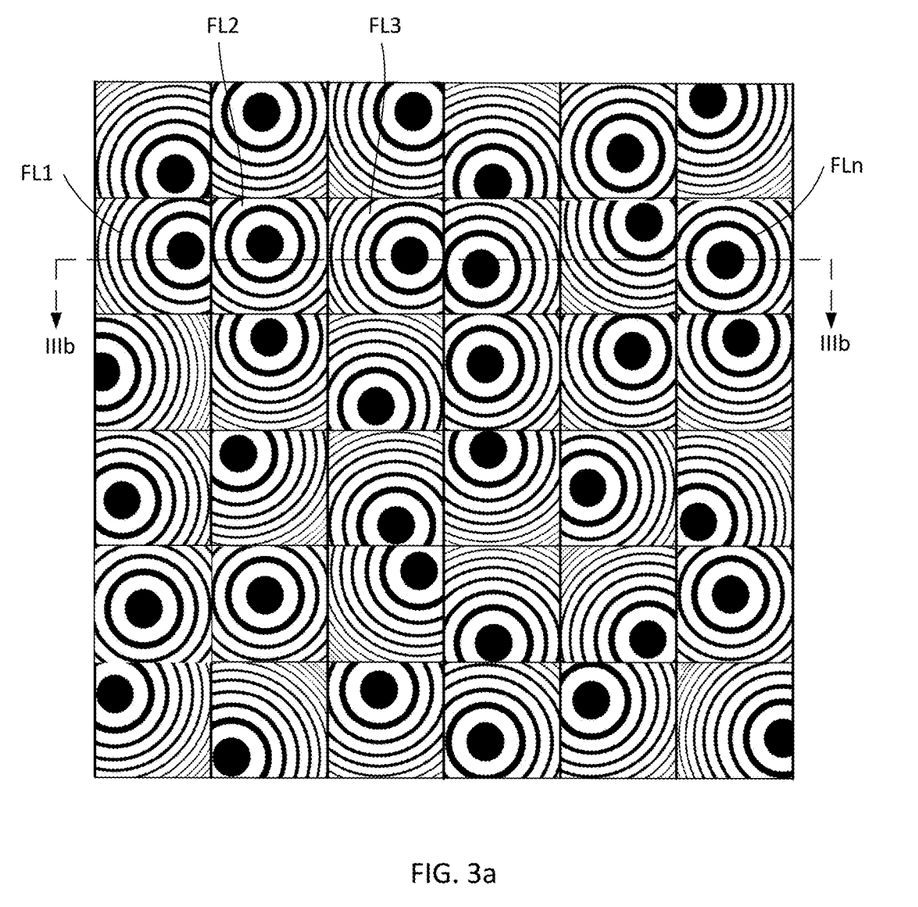
FIG. 3a is a view of a part of a non-transparent screen illustrating random arrangement of micro illuminators in the pixels of the screen.
Figure 3B:
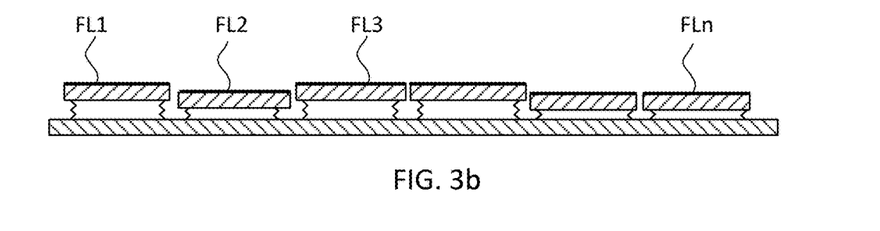

The invention is based on the principle of dynamically processing a light coded with a phase shift keying in holograms, where emitters are much bigger than holographic fringes. FIG. 3a is a view of a part of a non-transparent screen illustrating random arrangement of microilluminators that are in the pixels of the screen SC when the MEMS/SLM is illuminated with a laser light beam. FIG. 3b is a sectional view along line IIIb-IIIb of FIG. 3a.

As can be seen from FIGS. 3a and 3b, each pixel of the screen SC is covered with a group of Fresnel lenses such as lenses FL1, FL2, FL3, . . . FLn. It can also be seen from FIG. 3b that each lens moveable in its respective pixel in accordance with coding of the image. It is important to note that for the rarefication principle of the invention the center points of the Fresnel lenses must be randomly arranged in the pixels of the screen.

To increase the reception angle of a hologram viewer, the cross-section size of the emitted beams on the outer surface of the pupil should be much smaller than the size of the emitters. This means that the size of the pixel is much greater than the size of a focal spot formed by the Fresnel lens (see FIG. 7).

The positions of the beams are randomized to suppress the ghost reflections which could occur in case of a regular arrangement of the emitter centers. The invention is a true also for 3D displays, which may be head mounted to show augmented and artificial reality video. A head mounted display will benefit from accurate positioning with respect to human pupils and restoration of the wave front at the surface of the pupils only, which greatly increases hologram performance and lowers restrictions on hardware.

One implementation is a conventional MEMS display with additional structures placed on each pixel, which makes beams with smaller focus, see FIG. 3b. The ghost images may be suppressed by placing the Fresnel lenses on the mirrors of the MEMS system in a randomized manner.

Figures 4, 5, 6:
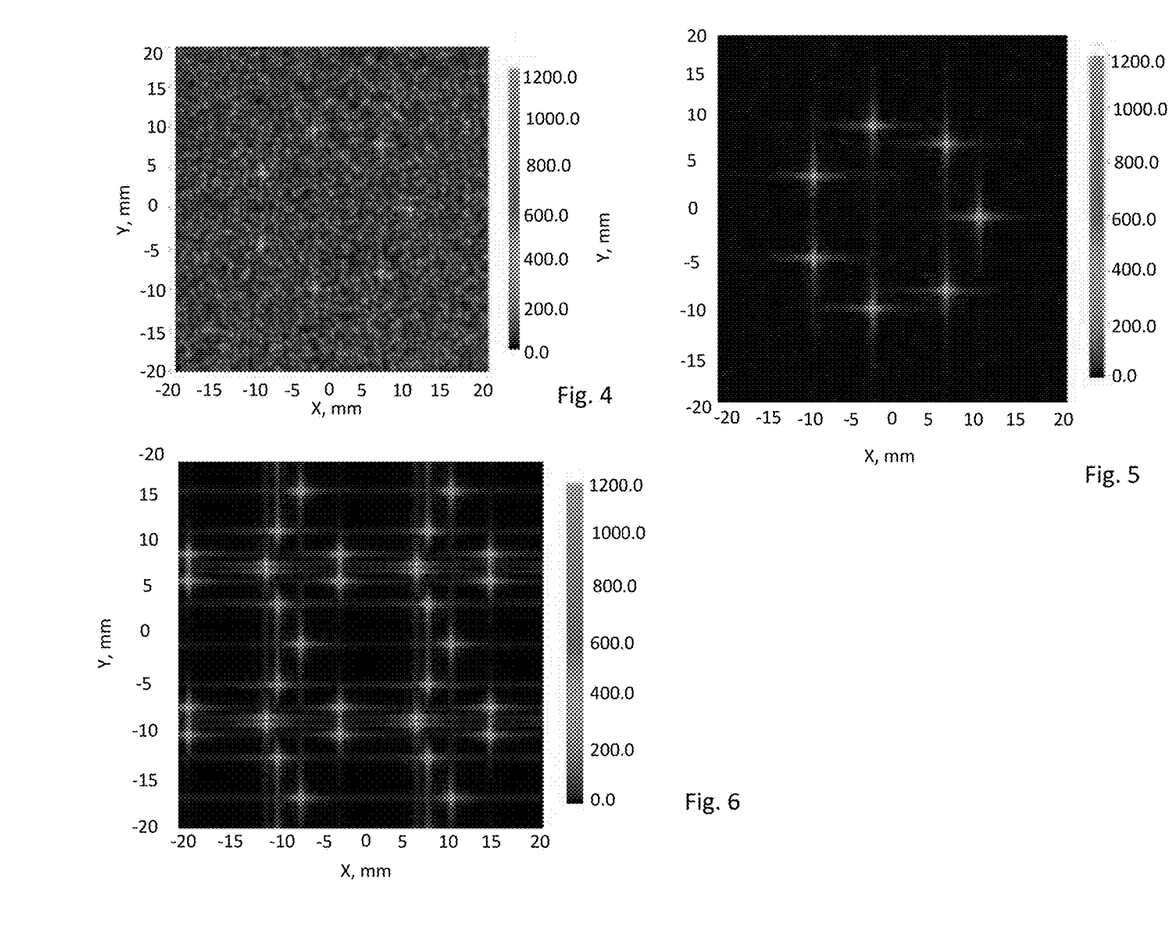
FIG. 4 shows a simulated visible optical field (square root of the intensity). The level of noise is a function of pixel pitch (32×32 pixels); the visible plane is 10 m from the viewer; in reality there are seven point sources at a black field.
FIG. 5 is similar to FIG. 4, but the display is 320×320 pixels; the simulation shows a much higher signal-to-noise ratio.
FIG. 6 is similar to FIG. 4, but the pixels are arranged into a regular grid; although the signal-to-noise is good, each source is repeated as ghosts.

Simulations of the ghost suppression are presented on FIGS. 4-6. These pictures show simulation of noise as a function of pixel pitch as well as suppression of ghost reflection by randomizing placing of the pixels. FIG. 4 shows simulated visible optical field (square root of the intensity). The visible plane is 10 m from the viewer, in reality there are 7 light point sources on a black field. This picture is a reconstruction visible in a 10×10 mm display composed of 32×32 pixels with randomized locations (1024 pixels in total). The simulated area is 40×40 mm (at 10 m from the viewer).

FIG. 5 also shows simulation of multiple ghost reflections of a seven-point picture. Conditions of observation are the same as in FIG. 4, but the display is now 320×320 pixels. We can observe much higher signal-to-noise ratio.

FIG. 6 shows simulation under the same condition as in FIG. 4, but the pixels are placed in a regular grid. Although the signal-to-noise is good, each light source is repeated as a ghost placed on a grid with approximately 17 mm steps (diffraction pattern from the pixel grid).

The method of coding of originals images with a hologram is an important part of the invention. In particular, there is a mapping of the image on the display (see FIG. 2), which allows calculating to be made only for a part of a holographic pattern of an image on the display. This saves the calculation time and decreases a parasitic light scattering. For example, an image of the girl's hand (point P2 in FIG. 2) is encoded only for the part S2 of the screen SC located between the hand and the pupil P of the eye, as shown by dashed lines.

The mapping procedure may be performed as described below. Let us assume that the coherence length of the light source LS is equal to or greater in diameter than the diameter D of the pupil P (see FIG. 2). Let us also assume that a virtual image that has to be generated has predetermined horizontal and vertical angular dimensions.

By connecting the extreme points of the virtual image with the point on the eye that limit the aperture of the eye pupil (as shown in FIG. 2), we obtain a tapered space in which a wavefront that must form the virtual image should propagate in the direction toward the eye Y. This wavefront may be generated by a reflective MEMS/SLM of a matrix type which changes phases of the light reflected from the pixels. Let us place such a modulator SC between the viewer's eye Y and the virtual image VI. For example, if we use an 8-bit reflective spatial matrix-type modulator with an active area of 25.6 mm×15.4 mm with a pixel pitch of 20 µm and with a resolution capacity of 1280×768 and divide the modulator into regular fragments, e.g., 10×10 pixels in each fragment, then we obtain about $10^4$ of such fragments. The hologram that is created in the above case by these $10^4$ points is a rarefied hologram obtained by the method of the invention. It is understood that $10^4$ points were given only as an example.

If we project lines from the extreme point of the pupil through the aforementioned fragments to respective points on the object, we will obtain about $10^4$ points which will present the virtual object VI in the viewer's eye.

It is understood, as we mentioned above, that the pixels of the reflective spatial matrix-type modulator should be coated with reflective Fresnel lenses (see FIGS. 3a and 3b).

The 8-bit reflective spatial matrix-type modulator with an active area of 25.6 mm×15.4 mm with a pixel pitch of 20 µm and with a resolution capacity of 1280×768 was given only as an example, and modulators, e.g., with high resolution such as 1280×1024, etc., as well as modulators with other pixel pitches, etc. also can be employed.

Figure 7:
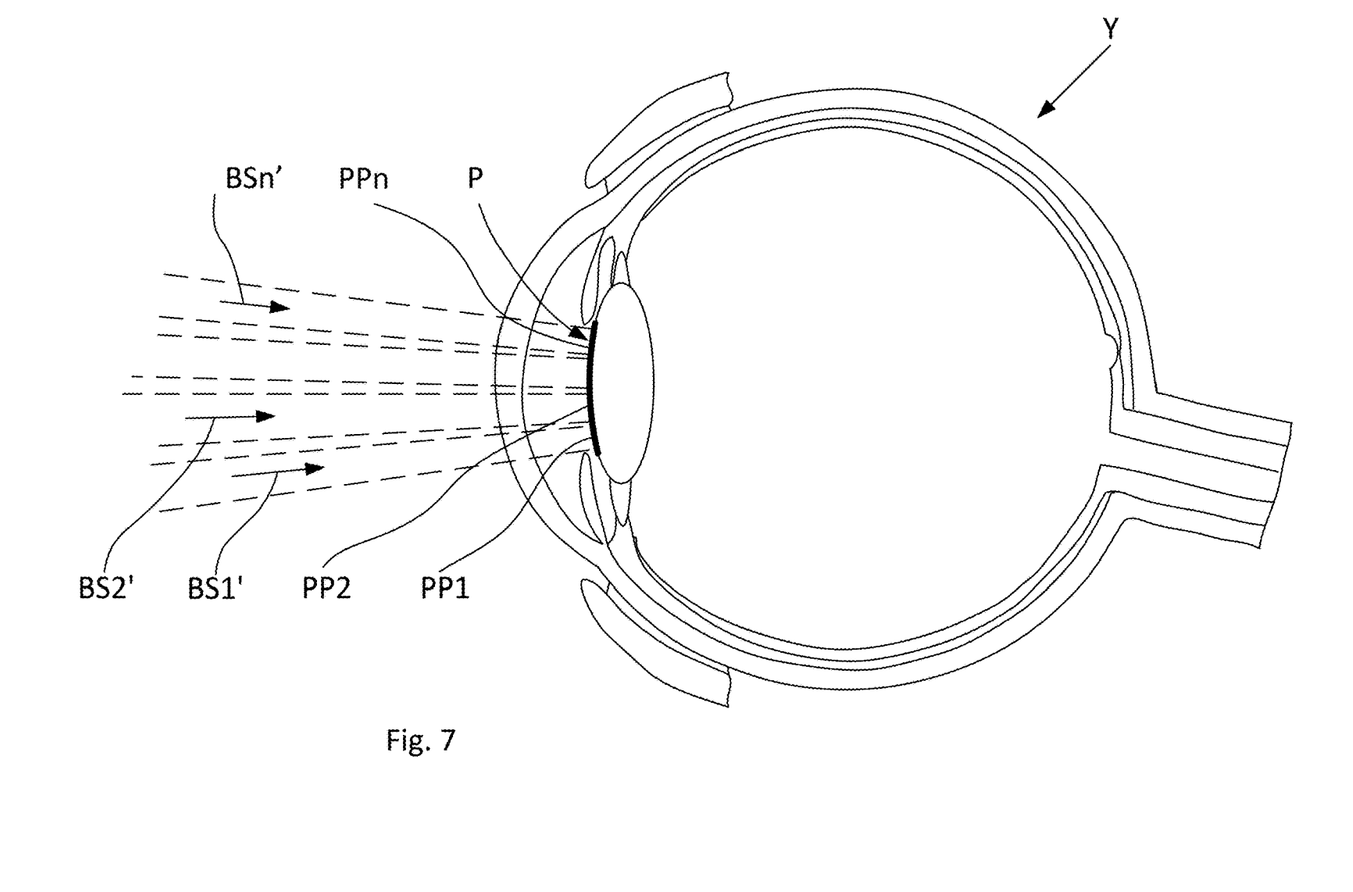
FIG. 7 shows an eye pupil outer surface illuminated with beams having a coherence length smaller than the size of the pupil.

The pupil surface can be illuminated with beams having a coherence length smaller than the size of the pupil, whereby it is possible to effectively subdivide the original image, the display, and the parts of the outer pupil surface into small interconnected fragments, which is shown on FIG. 7. In this case, the pupil will be divided into smaller parts PP1, PP2, . . . PPn. These parts correspond to coherent length of a light source LS and the display fragmentation S1, S2, . . . Sn (FIG. 2) corresponds to these smaller parts PP1, PP2, . . . PPn of the outer pupil surface. Light beams generated by display SC fragments S1, S2, . . . Sn are designated as BS1', BS2', . . . BSn'.

In FIG. 1b it is shown that the screen SC is arranged in a position in which its surface is not perpendicular to the eye axis XI-XI. With this arrangement, the beams reflected from screen to the eye in a zero order (an incident angle is equal to the reflection angle). However, the screen may be oriented perpendicular to the eye axis. In this case, a direction of the incident light should be selected so that it would be possible to provide entering the eye of the reflected beams of the first or another highest order.

Since a head mounted device may have left and right displays for left and right eyes, respectively, it is important to encode in left and right holograms the binocular parallax matching the distance of the respective part of the image to the respective eye.

The principle of the invention is applicable to any displays that can be coded as holograms. For example, this can be a display in the form of a conventional on/off LCD matrix, where pixels with desirable phases can be simply switched on and off. It is understood that the noise will be smaller if at least 50% of the pixels are switched off. Another implementation is an MEMS/SLM, where phases are shifted and the phase shift, in turn, can be subdivided into 4, 8, 16 or even 256 positions. One more implementation may be a MEMS/SLM mirror matrix with two positions separated by a quarter of the wavelength of the laser light or with 4, 8, 16 or even 256 positions.

Coding the positions of the mirrors that should correspond to the rarefied target image is based on the phase of a beam generated by the respective mirror in the pupil of the viewer eye. This phase is chosen to approximate the wave front function w (x,y) which is determined by the following formula:

$$w(x,y)=f_{in}(x,y)f_{out}(x,y)$$

where $f_{in}(x,y)$ is the wave delivered by laser, $f_{out}(x,y)$ is the content wave to be restored by the display and observed by the viewer, where $$f_{in}(x, y) \cong C\exp(ik\, r)$$
$$f_{out}(x, y) \cong \sum_m C_m \exp(-ik\, r_m),$$

where k is a wave vector, r is the distance from each pixel to the laser light source, $r_m$ is the distance from each pixel to certain current image point m, and C and $C_m$ are coefficients.

The phase of binary shifted emitters is calculated by approximating the aforementioned wave front function at the emitting point by formula: Pi=sign W(x,y) where x, y are coordinates of the emitter center.

Alternatively, the phase of discretely shifted emitters is calculated by approximating the above wave front function at the emitting point by using a phase nearest to w(x,y) where x, y are coordinates of the emitter center.

To suppress the speckles many frames per second may be encoded with different phases of original image, resulting in effective averaging of brightness variations.

Figure 8:
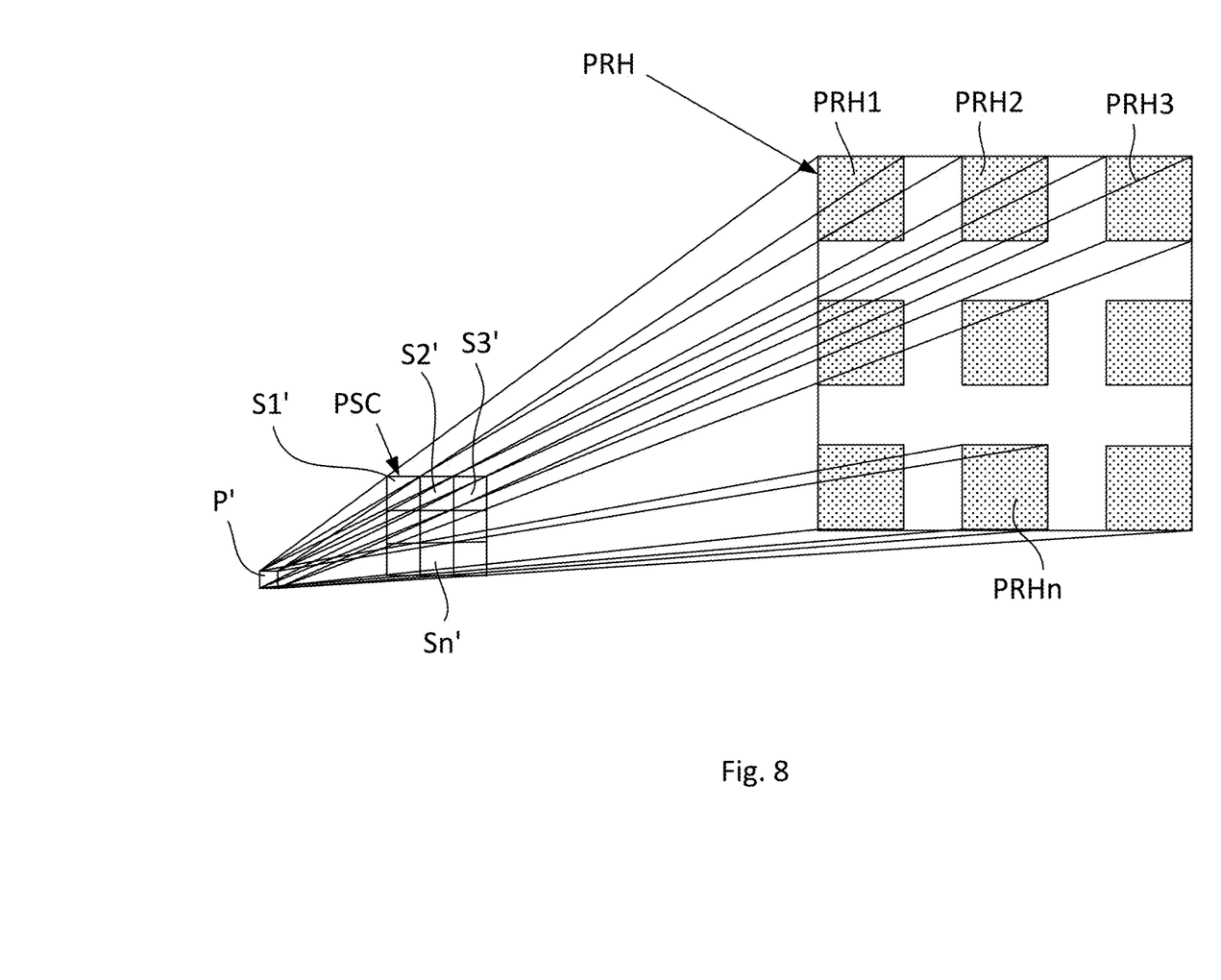
FIG. 8 illustrates relationship between the pupil of a viewer's eye, a part of the screen that generates a virtual image (rarefied hologram), and the virtual image per se.

FIG. 8 illustrates relationship between the pupil of a viewer's eye, a part of the screen that generates a virtual image (hologram), and the virtual image (rerified hologram). In this drawing, P' designates a pupil of the viewer's eye which is shown schematically. Symbol PSC designated a part of the screen SC (FIG. 2). It should be noted that the parts S1', S2', S3' . . . Sn' (FIG. 8) of the screen SC (FIG. 2) are responsible for reproducing discrete parts PRH1, PRH2, PRH3 . . . PRHn of the portion PRH of the virtual image VI on the rarefied hologram (FIG. 2). It can be seen that the discrete parts S1', S2', S3' . . . Sn' do not cover the entire surface of the virtual image and therefore the virtual image reproduced by such discrete parts is named as a rarefied hologram.

Note, that any change in the size or design of hologram-based displays will require recalculation of the phases. Calculations are faster if the image has a low information capacity like an augmented reality, consisting from several points, arrows, or lines. Holographic encodings of the lines, points or other sample images can be stored in a computer library and used without extensive calculations.

Although the invention has been described and illustrated with reference to the specific description and drawings, it is understood that any changes and modifications are possible without deviation from the scope of the attached claims. For example, the laser light can be modulated by means of liquid crystal. The modulation of light can be confined by using optical planar ridge waveguides. The light can be modulated by using a ferroelectric material. The phase shifts can be approximated by means of an on/off LC matrix. The pixels can be provided with additional features for maintaining the size of emitted beams much smaller than the size of the emitting spots. Additional features can be used for focusing gratings etched on the surface of the piston mirrors of the MEMS. The additional features may comprise static focusing gratings that direct the light to piston mirrors. The additional features may comprise static focusing gratings that direct the light to an LC matrix. It is also possible to measure the phase shifts of emitters caused by manufacturing inaccuracies and to take into account the determined inaccuracy in calculation of the wave front function. Focusing features of the MEMS in the form of Fresnel lenses may be replaced by holographic lenses etched on the pixel surfaces.

The invention claimed is:

1. A method of forming a rarefied hologram for video imaging and 3D lithography comprising the steps of:
providing non-holographic dynamic microelectromechanical system mirrors and liquid crystal displays (MEMS/SLM) having a surface, a plurality of pixels on the surface, seen by a viewer's eye, and placed at a fixed distance from the retina of the viewer's eye, a laser light source for illuminating the pixels of the MEMS/SLM, and a computing device, the viewer's eye pupil having a diameter;
providing an initial desired image, which has to be holographically reproduced by the MEMS/SLM as a remote virtual 3D image visible remotely by the viewer's eye;
providing a code for generation of a holographic pattern of the initial desired image and coding the initial desired image by breaking it into plurality of groups and assigning groups of MEMS/SLM pixels to predetermined groups of said plurality responsible for reproducing predetermined parts of the initial desired image;
irradiating the surface of the MEMS/SLM by a laser beam, which is emitted from the laser light source and has a coherence length equal to or greater than the diameter of the pupil of the viewer's eye;
mapping the MEMS/SLM surface by encoding and calculating only a part of the initial desired image;
controlling operations of the pixels in accordance with the code for generation of the holographic pattern perceived by the viewer's eye as a remote virtual 3D image, wherein each pixel has a light emitting spot and the step of providing a code for generation of a holographic pattern comprises changing of a phase of light reflected from the light emitting spot of each pixel; and
covering each pixel with a group of Fresnel lenses, wherein each pixel is moveable in accordance with the code of the image, and each Fresnel lens has a focal spot and a center point.

2. The method according to claim 1, wherein the center points of the Fresnel lenses are randomly arranged in the pixels.

3. The method according to claim 1, wherein a size of each pixel is greater than a size of the focal spot formed by each Fresnel lens.

4. The method according to claim 2, wherein a size of each pixel is greater than a size of the focal spot formed by the Fresnel lens.

5. The method according to claim 4, wherein the phase is binary shifted.

6. The method according to claim 2, comprising a step of choosing the phase of light reflected from each pixel to approximate a wave front function w (x,y) of a laser light in accordance with the following formula:

$w(x,y) = f_{in}(x,y) f_{out}(x,y)$ where $f_{in}(x, y)$ is a wave delivered by laser, $f_{out}(x,y)$ is a content wave to be restored by the MEMS/SLM and observed by the viewer, where $$f_{in}(x, y) \cong C \exp(ik\, r)$$
$$f_{out}(x, y) \cong \sum_m C_m \exp(-ik\, r_m)$$

where k is a wave vector, x and y are coordinates of the light emitting spot of each pixel, r is a distance from each pixel to the laser light source, $r_m$ is a distance from each pixel to a current image point m, and C and $C_m$ are coefficients.

7. The method according to claim 6, wherein the phase is binary shifted.

8. The method according to claim 7, wherein the phase of binary shifting is calculated by approximating the wave front function at the emitting spot by formula: Pi=sign W(x,y).

9. The method according to claim 3, comprising a step of choosing the phase of light reflected from each pixel to approximate a wave front function w (x,y) of a laser light in accordance with the following formula:

$w(x,y) = f_{in}(x,y) f_{out}(x,y)$ where $f_{in}(x, y)$ is a wave delivered by laser, $f_{out}(x,y)$ is a content wave to be restored by the MEMS/SLM and observed by the viewer, where $$f_{in}(x, y) \cong C \exp(ik\, r)$$
$$f_{out}(x, y) \cong \sum_m C_m \exp(-ik\, r_m)$$

where k is a wave vector, x and y are coordinates of the light emitting spot of each pixel, r is a distance from each pixel to the laser light source, $r_m$ is a distance from each pixel to a current image point m, and C and $C_m$ are coefficients.

10. The method according to claim 9, wherein the phase is binary shifted.

11. The method according to claim 10, wherein the phase of binary shifting is calculated by approximating the wave front function at the emitting spot by formula: Pi=sign W(x,y).

* * * * *